United States Patent
Blackburne, Jr.

(10) Patent No.: US 10,981,090 B2
(45) Date of Patent: Apr. 20, 2021

(54) METHOD OF MANUFACTURING A WELL COMPLETION PIPE AND MESH FILTER ASSEMBLY

(71) Applicant: Edward F. Blackburne, Jr., New York, NY (US)

(72) Inventor: Edward F. Blackburne, Jr., New York, NY (US)

(*) Notice: Subject to any disclaimer, the term of this patent is extended or adjusted under 35 U.S.C. 154(b) by 49 days.

(21) Appl. No.: 16/122,449

(22) Filed: Sep. 5, 2018

(65) Prior Publication Data

US 2019/0070530 A1 Mar. 7, 2019

Related U.S. Application Data

(60) Provisional application No. 62/554,166, filed on Sep. 5, 2017.

(51) Int. Cl.

| | | |
|---|---|---|
| *B01D 29/11* | (2006.01) | |
| *B01D 29/21* | (2006.01) | |
| *E21B 43/08* | (2006.01) | |
| *B01D 29/15* | (2006.01) | |

(52) U.S. Cl.
CPC .......... *B01D 29/111* (2013.01); *B01D 29/15* (2013.01); *B01D 29/216* (2013.01); *E21B 43/084* (2013.01); *E21B 43/088* (2013.01); *B01D 2201/0407* (2013.01); *B01D 2221/04* (2013.01)

(58) Field of Classification Search
CPC .... B01D 29/111; B01D 29/15; B01D 29/216; E21B 43/088; E21B 43/084
See application file for complete search history.

(56) References Cited

U.S. PATENT DOCUMENTS 7,287,684 B2 * 10/2007 Blackburne, Jr. ..... B01D 29/111
228/130

\* cited by examiner

*Primary Examiner* — Jason L Vaughan
*Assistant Examiner* — Amanda Kreiling
(74) *Attorney, Agent, or Firm* — Richard Eldredge; Eldredge Law Firm

(57) ABSTRACT

A method of manufacturing a base pipe for use in horizontal well completion, the method includes wrapping an inner shroud around a base pipe, the inner shroud is disconnected from the base pipe and forms seams along each edge of the inner shroud; fusing the seams together; allowing the inner shroud to cool, the inner shroud shrinks around the base pipe to form a friction lock between the base pipe and the inner shroud; laying a filter medium onto an outer shroud, wherein the filter medium is disconnected from the outer shroud, thereby creating a mesh filter medium/outer shroud sheet; wrapping filter medium/outer shroud sheet around the inner shroud, the filter medium is positioned between the inner shroud and outer shroud, thereby creating a second set of seams; and fusing the second set of seams together, thereby creating a second friction lock between the outer shroud and the inner shroud.

13 Claims, 6 Drawing Sheets

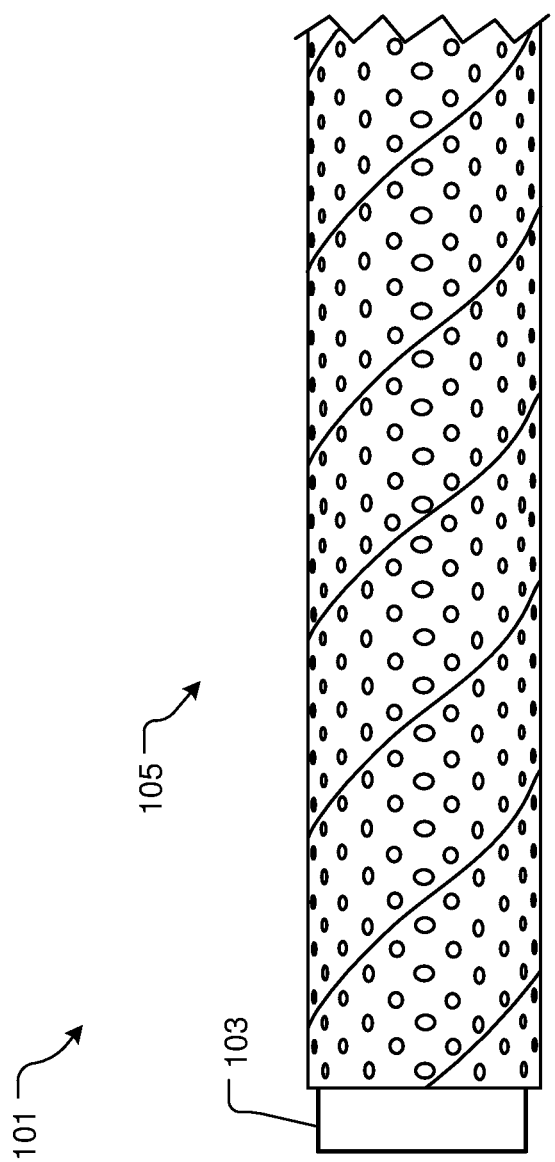
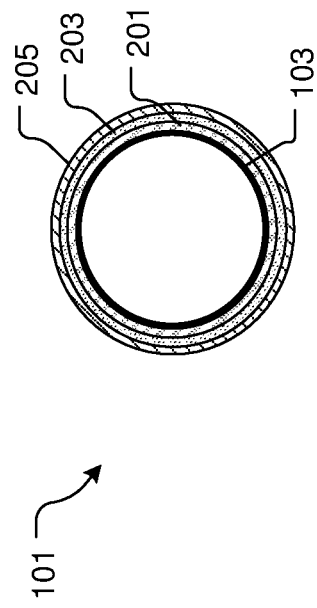

METHOD OF MANUFACTURING A WELL COMPLETION PIPE AND MESH FILTER ASSEMBLY

BACKGROUND

1. Field of the Invention

The present invention relates generally to well completion systems, and more specifically, to a method of manufacturing a well completion and mesh filter assembly wherein the mesh filter assembly is wrapped directly to the well completion, thereby providing a superior assembly for use in well drilling.

2. Description of Related Art

Well completion systems are well known in the art and are effective means to drill into the earth for the creation of wells. Well completion systems generally include a base completion with a mesh filter secured to the base pipe. Conventional methods of securing the mesh filter to the base pipe involve assembling the mesh filter independently and then sliding the mesh filter over an end of the pipe to then be secured in place. The mesh filter is then held in place with one or more end rings.

One of the problems commonly associated with conventional well completion systems is failing end rings. This is due to high pressure being applied to the well completion assembly during use, specifically during horizontal drilling of a well. The failing of one or more end rings can lead to additional expense and labor to repair the well and drilling site.

Accordingly, although great strides have been made in the area of well completion systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 1 is a side view of a well completion and mesh filter assembly as manufactured by the method of the present application;

FIG. 2 is a cross sectional view of the assembly of FIG. 1;

Figure 3:
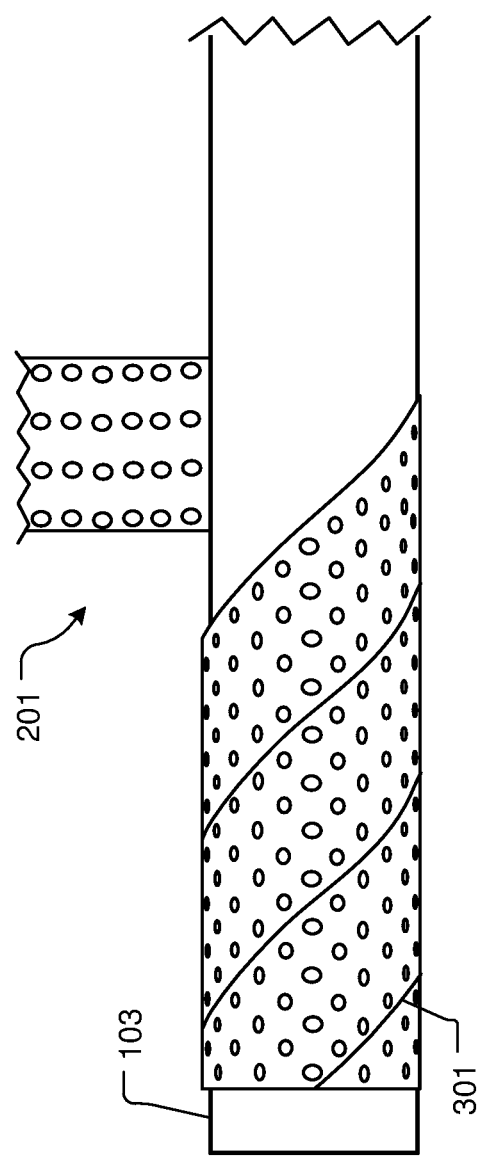
FIG. 3 is a simplified side view a first phase of the method of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional well pipe drilling assemblies. Specifically, the present invention provides a method to manufacture a base pipe with a mesh filter assembly wrapped around the base pipe, thereby creating a friction lock between the base pipe and the mesh filter assembly. It should be understood that this allows for the base completion system to withstand increase frictional force. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a simplified side view of a well completion system 101 created by a method in accordance with the present application. It will be appreciated that system 101 overcomes one or more of the above-listed problems commonly associated with conventional well completion systems.

In the contemplated embodiment, system 101 includes a base pipe 103 having a mesh filter assembly 105 wrapped around base pipe 103. The method of the present invention allows for the mesh filter assembly to wrapped directly to the base pipe 103, wherein the mesh filter assembly 105 is not welded, fused, or otherwise directly secured to base pipe 103. It should be understood that during the method, mesh filter assembly 105 will contract around base pipe 103, thereby creating a tight frictional lock between assembly 105 and pipe 103.

In FIG. 2, a cross sectional view of system 101 shows the various layers associated with the mesh filter assembly. In the preferred embodiment, an inner shroud 201 is wrapped around pipe 103. Inner shroud 201 is a rigid support structure for securing around pipe 103 and can be composed of any reasonable material, such as stainless steel or carbon steel. In addition, inner shroud 201 can be perforated with holes or slits of varying sizes, serving to axially transport filtrate fluids.

In the preferred embodiment, mesh filter assembly 105 further includes a mesh filter medium 203 positioned around inner shroud 201. Mesh filter medium 203 can vary in width and materials as desired and functions to mesh filter contaminants, debris, and dirt from fluid used during the drilling of a well. It should be appreciated that various types of mesh filter mediums are available, and can be selected as desired for a specified task. Such mediums include meshes, wires, and/or porous sheets. It should further be appreciated and understood that mesh filter medium 203 can be composed of a plurality of layers, or can be a single layer.

Mesh filter assembly 105 further includes an outer shroud 205 configured to protect mesh filter medium 203 and retain mesh filter medium 203 in the desired position next to inner shroud 205. Outer shroud 205 can be composed of any rigid material, including steels and the like. It should be appreciated that outer shroud 205 is not welded or otherwise physically secured to inner shroud. Outer shroud is configured to be fused at a plurality of seams, thereby causing outer shroud 205 to shrink upon cooling and form tension on mesh filter medium 203 and inner shroud 201, thereby retaining the assembly in place.

In FIGS. 3-7, various views depict the method associated with the present invention. It should be understood that the method involves manufacturing base pipe 103 with mesh filter assembly 105 being added to base pipe 103 during the manufacturing process. Conventional methods involve manufacturing mesh filter assembly 105 separately and adding assembly 105 to pipe 103 at a different time with additional structures such as end rings.

As shown in FIG. 3, the first phase of the present invention requires wrapping of inner shroud 201 helically about pipe 103. The wrapping creates a plurality of seams 301, which are fused together via welding or other similar means. The welding of seams 301 causes inner shroud 201 to heat up. During the cooling of seams 301, shroud 201 begins to shrink, thereby tightening around pipe 103. The tightening around pipe 103 creates a friction lock between pipe 103 and shroud 201, thereby retaining shroud 201 in place. It must be understood that shroud 201 is not welded or fused in any way to pipe 103. It should be appreciated that the friction lock created is strong enough to withstand up to or more than 15,000 pounds per foot. This strength helps avoid failing commonly associated with end rings.

Figure 4:
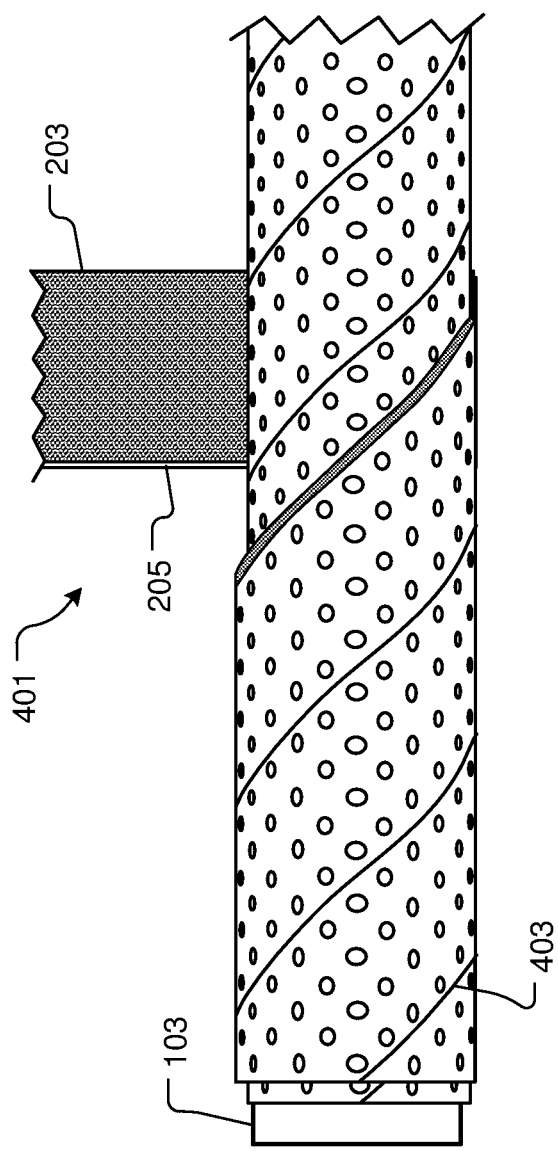
FIG. 4 is a simplified side view of a second phase of the method of the present application.

As shown in FIG. 4, a second phase of the present invention involves wrapping of outer shroud 205 and mesh filter medium 203 around inner shroud 201. Before wrapping outer shroud 205 and mesh filter medium 203, mesh filter medium 203 and outer shroud 205 are laid together to form a sheet 401 that is combined mesh filter medium 203 and outer shroud 205. Sheet 401 is then used to wrap around inner shroud 201, thereby creating a plurality of seams 403. Seams 403 are fused/welded together, thereby causing a shrinking effect when cooled and further causing an additional friction lock between the outer shroud and the inner should, and putting additional pressure on pipe 103 to better hold the entire mesh filter assembly 105 to pipe 103. During this phase, it should be understood that the outer shroud can be formed by cold-rolling metal or other similar material. It must further be understood that only outer shroud 205 receives welding of seams.

It should be appreciated that a mechanical seal is created between seems of the mesh filter medium in order to ensure proper filtration of the mesh filter assembly. In one embodiment, the mesh filter medium is has an appropriate width to overlap with itself during the laying of the mesh filter medium/outer shroud sheet. The overlapping seams are sealed by pressure from the outer shroud during the laying process.

Figure 5B:
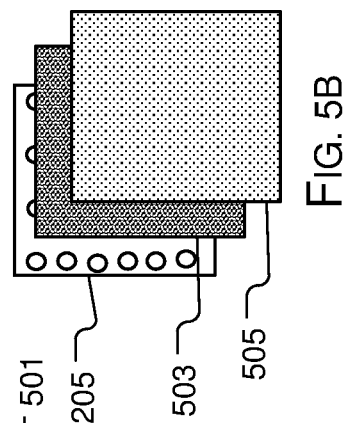
FIGS. 5A and 5B are simplified cutouts of a sheet assembly of FIG. 4.
Figure 5A:
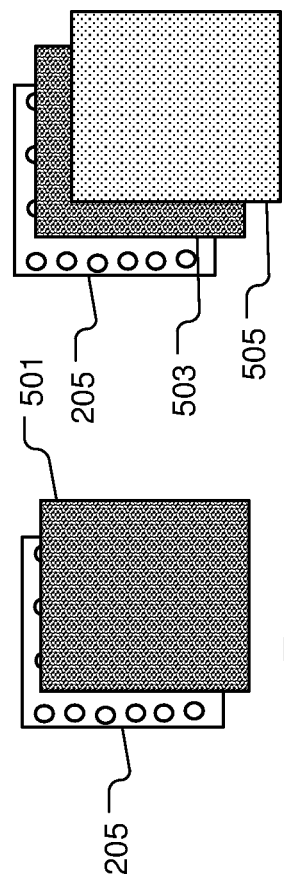

FIGS. 5A and 5B depict examples of mesh filter medium 203, wherein 5A shows a single layer 501 mesh filter medium and 5B demonstrates a multi layer 503, 505 mesh filter medium. It should be appreciated that mesh filter medium 203 is not limited to two layers, and FIGS. 5A and 5B are merely shown by way of example. It should further be understood that in embodiments having a plurality of mesh filter medium layers, each layer is composed of one or more sheets, wherein the sheets are laid together placing the seams in an offset pattern, thereby preventing the seams from being aligned. It should further be understood that each layer lays flush against the previous layer, thereby maintaining a low overall diameter of the system.

Figure 6:
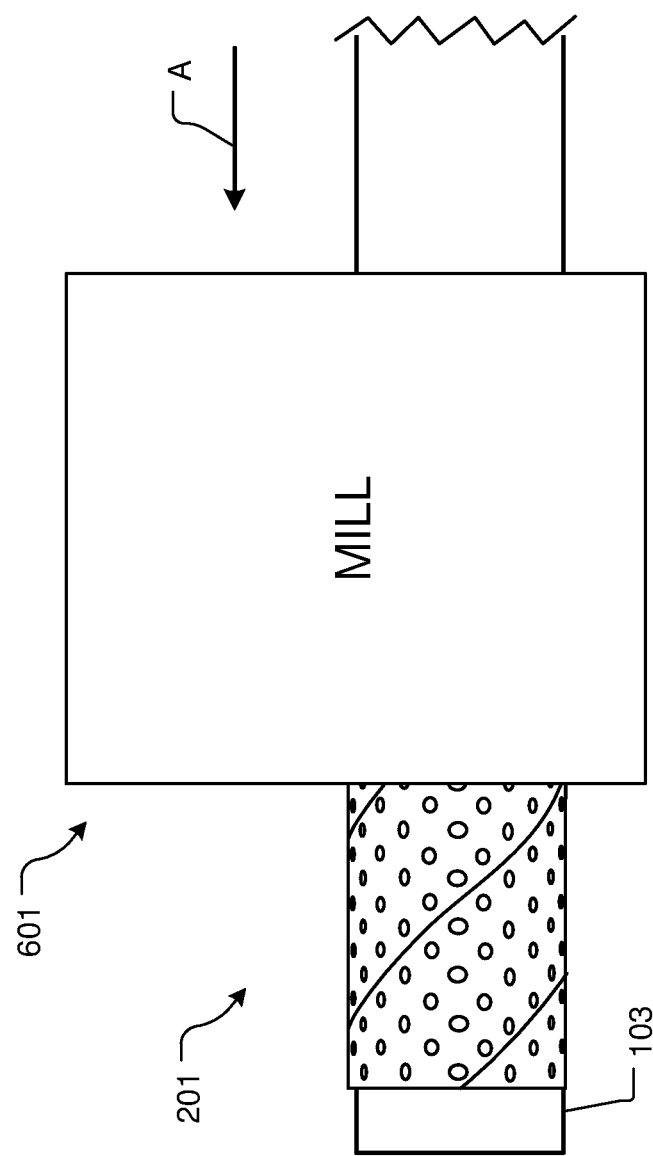
FIG. 6 is a simplified side view of the first phase of the method of the present application with the use of a mill.
Figure 7:
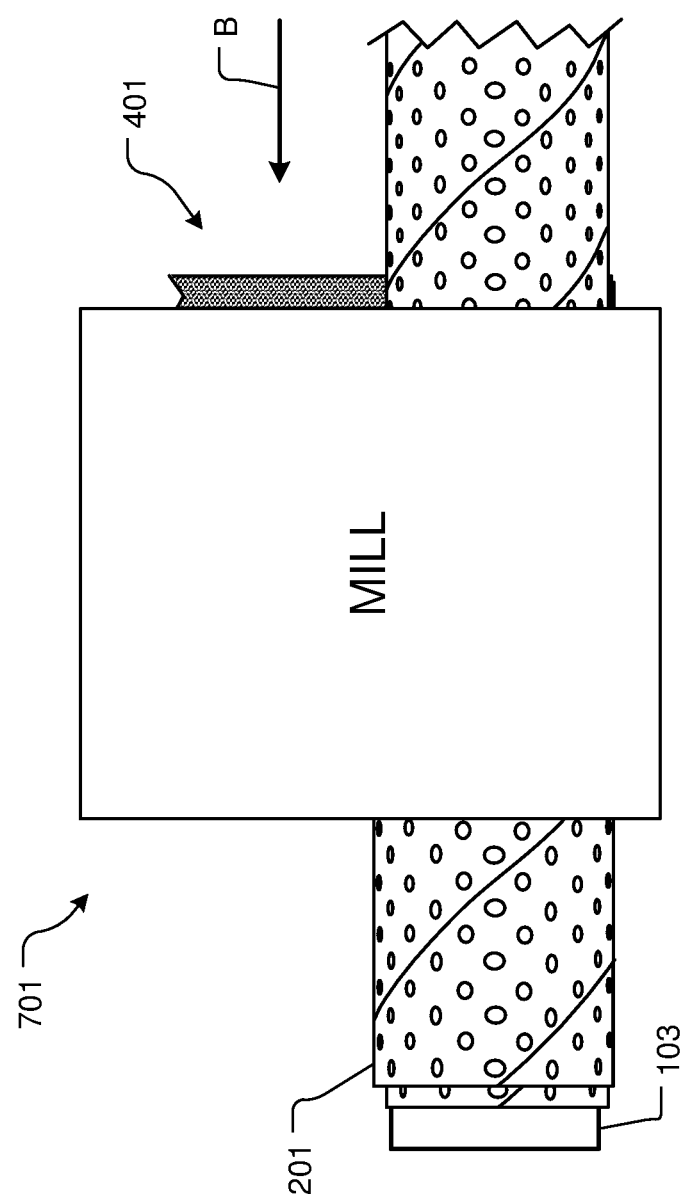
FIG. 7 is a simplified side view of the second phase of the method of the present application with the use of the mill.

In FIGS. 6 and 7, the phases of the method of the present invention shown in FIGS. 3 and 4 are shown with one or more mills 601, 701 configured to assemble the various layers together. In FIG. 6, pipe 103 is sent through mill 601 in the direction of arrow A, wherein mill 601 is configured to helically wrap inner shroud 201 about pipe 103, fusing the plurality of seams together along the way. Similarly, in FIG. 7 pipe 103 and inner shroud 201 are sent through mill 701 in the direction of arrow B, wherein sheet 401 is wrapped around inner shroud 201. It should be understood that only outer shroud 205 is being welded/fused at the seams, and not mesh filter assembly 203. It should further be understood that the above mentioned steps can occur almost simultaneously in a single mill, and two figures are shown merely for clarity.

It should be appreciated that one of the unique features believed characteristic of the present application is the manufacturing of the system wherein the mesh filter assembly is manufactured with the pipe, thereby eliminating the need for additional structures to retain a mesh filter assembly to a pipe. It should be appreciated that frictional force created between the inner shroud and the pipe, and the outer shroud and the pipe, retain the mesh filter assembly to the pipe. It should further be understood that this feature allows for a smaller overall diameter of the system versus conventional well completion systems. In addition, this feature creates a system capable of withstanding large amounts of friction, as is common during the drilling of a well.

Figure 8:
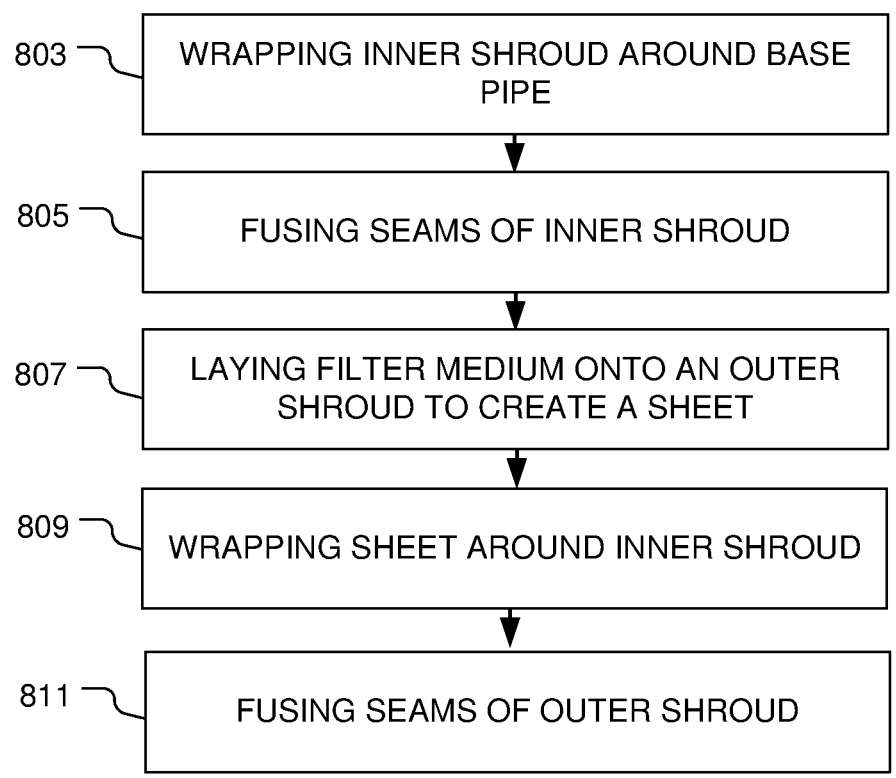
FIG. 8 is a flowchart of the method of the present invention.

In FIG. 8, a flowchart 801 summarizes the method of the present invention. The inner shroud is wrapped around the base pipe, wherein a plurality of seams are thereby created, as shown with box 803. The seams are sealed through fusion/welding, thereby causing the inner shroud to contract tightly around the base pipe, as shown with box 805. The contraction around the base pipe forms a friction lock between the inner shroud and the base pipe, thereby retaining the inner shroud in place. It should be appreciated that the aforementioned steps can occur through a mill, wherein a base pipe is moved through the mill while being wrapped.

A mesh filter medium/outer shroud sheet is created by laying the outer shroud and mesh filter medium together, as shown with box 807. It should be understood that various methods could be used to achieved this feature, one method being cold rolling the outer shroud onto a plurality of mesh filter medium sheets, thereby creating mechanical sealing of the plurality of mesh filter medium sheets together. The mesh filter medium/outer shroud sheet is then helically rolled onto the inner shroud/base pipe, as shown with box 809. This process can take place via the use of a mill, wherein a plurality of seams associated with the outer shroud are fused together, as shown with box 811. It should again be appreciated that fusing the seams causes the outer shroud to heat up and then contract to tighten around the inner shroud and frictionally lock the assembly together.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method of manufacturing a pipe for use in horizontal well completion, the method comprising:
    providing a base pipe having an outer surface;
    wrapping an inner shroud around the base pipe, wherein the inner shroud is disconnected from the base pipe and forms a plurality of seams along each edge of the inner shroud;
    welding the plurality of seams together, wherein welding only occurs along the plurality of seams;
    allowing the inner shroud to cool, wherein the inner shroud shrinks around the base pipe to form a friction lock between the base pipe and the inner shroud;
    laying a mesh filter medium onto the inner shroud, wherein the mesh filter medium is disconnected from the inner shroud, thereby creating a mesh filter shroud sheet;
    wrapping the mesh filter shroud sheet around the inner shroud;
    wrapping an outer perforated outer shroud around the mesh filter shroud sheet, the perforated outer shroud having a seam;
    welding solely the seam of the perforated outer shroud;
    wherein the mesh filter medium is positioned between the inner shroud and outer shroud;
    wherein welding of the plurality of seams of the inner shroud and the seams of the perforated outer shroud creates a friction lock between the inner shroud and the perforated outer shroud to the outer surface of the base pipe.

2. The method of claim 1, wherein the wrapping of the inner shroud around the base pipe and the wrapping of the mesh filter shroud sheet around the inner shroud are achieved through helical wrapping.

3. The method of claim 1, further comprising:
    overlapping edges of the mesh filter medium during the wrapping of the mesh filter shroud sheet; and
    providing a mechanical seal in the mesh filter medium.

4. The method of claim 1, wherein the wrapping of the mesh filter medium/outer shroud sheet is performed to a diameter of the outer shroud that achieves a pre-determined frictional engagement between the inner shroud, the mesh filter medium, and the outer shroud.

5. The method of claim 1, wherein the outer shroud is a perforated metal sheet.

6. The method of claim 1, wherein the mesh filter medium further comprises:
    a plurality of mesh filter layers.

7. The method of claim 6, wherein each of the plurality of mesh filter layers have a width less than a width of the outer shroud.

8. The method of claim 6, wherein each of the plurality of mesh filter layers include adjoining mesh filter sheets having a seam between the adjoining mesh filter sheets, and the seam is substantially offset from seams in adjacent mesh filter layers; wherein the seams form a seal between the layers.

9. The method of claim 1, wherein the outer shroud is made from any one of stainless steel and carbon steel.

10. The method of claim 1, wherein the inner shroud is made from any one of polymer and stainless steel.

11. The method of claim 1, further including cold-rolling the mesh filter medium/outer shroud sheet around the inner shroud.

12. The method of claim 1, wherein the outer shroud alternatively resists radially inward and outward forces acting on the outer shroud.

13. The method of claim 1, further comprising:
    directing the base pipe into a mill, wherein subsequent wrapping around the base pipe of the inner shroud takes place via the mill, and wrapping of the inner shroud with the mesh filter medium/outer shroud sheet takes place via the mill.

* * * * *